Figure 2:
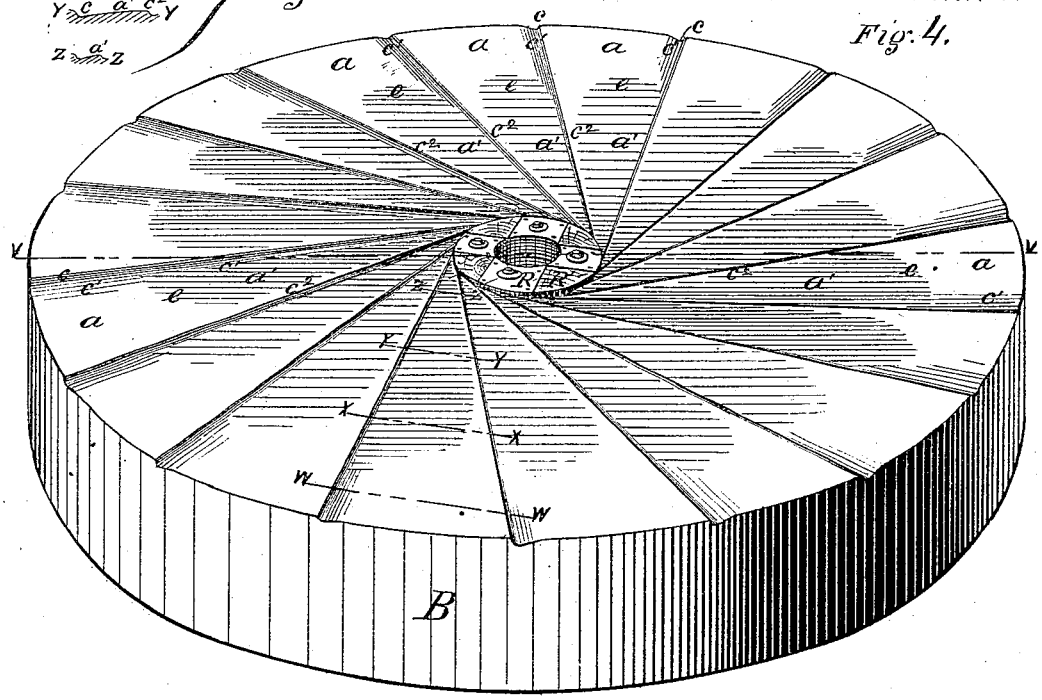

(No Model.)

B. D. SANDERS.
MILLSTONE DRESS.

No. 246,216. Patented Aug. 23, 1881.

Witnesses
Francis L. Clark
C. L. Harker

Inventor Benjamin D. Sanders,
By Attorney George H. Christy

UNITED STATES PATENT OFFICE.

BENJAMIN D. SANDERS, OF CROSS CREEK DISTRICT, (WELLSBURG P. O.,) WEST VIRGINIA.

MILLSTONE-DRESS.

SPECIFICATION forming part of Letters Patent No. 246,216, dated August 23, 1881.

Application filed April 30, 1880. (No model.)

*To all whom it may concern:*

Be it known that I, BENJAMIN D. SANDERS, of Cross Creek District, Wellsburg P. O., county of Brooke, State of West Virginia, have invented or discovered a new and useful Improvement in Millstones and Apparatus for Running the Same; and I do hereby declare the following to be a full, clear, concise, and exact description thereof, reference being had to the accompanying drawings, making a part of this specification, in which—like letters indicating like parts—

Figure 1 is a vertical sectional view of a pair of millstones illustrative of my invention, the section being taken in the plane of the line *v v*, Fig. 2. Fig. 2 is a top perspective view of the bed-stone; and Figs. 3 and 4 are diagram views illustrative of certain forms in the grinding-faces of the stones, as hereinafter explained.

In grinding flour from wheat the aim of the miller is to produce a comparatively large proportion of middlings of uniform grade with as little cutting or abrasion of bran as possible. An essential condition to the securing of these results is a steady and true running of the stones, without which no degree of mechanical skill can secure a uniform product or the best grinding. By careful study and continued experiment I have found the cause of much of the trouble experienced, and have devised means of removing the cause and preventing the injurious results that follow therefrom. I have observed that in course of use the faces of the stones at and near the skirt become worn away, rounding off the edges toward the periphery; also, the faces are usually worn "in wind"—that is, a trough-like hollow is made in the direction of one diameter, leaving corresponding rounded elevations in a transverse direction or at the sides of the hollow; and if the stones are left to wear, this trough-like hollow will gradually shift or travel around the stone until a complete circuit has been made. The tendency to such conformation by use has, so far as my knowledge extends, been common to all run of stone as heretofore put up and opperated. The disposition and manner of shifting of this irregularity will be observed only by close measuring and continued observation; but that unevenness or irregularities of some kind are continually developing by use is generally known, and it is to remove the same, as well as gum or glaze, that the careful miller is continually picking and dressing his stone. I have found that the primary cause of this peculiar wearing action is the irregular heaping or piling up of bran and meal between the stones, near the eye, where the motion is comparatively slow, resulting largely from the manner in which the stones have been dressed.

It has been customary to extend some or all of the lands or grinding-faces of the stones from the skirt to the eye; but in various forms and arrangements these lands were flat or level in the direction of the stone's motion, and as a kernel of grain is carried across or between such level land-faces it is crushed on its first passage to a thickness, in one direction at least, nearly equal to its final reduction. The motion of the runner near the eye, or where this first reduction takes place, is comparatively slow, and the excessive work required, as above stated, causes a heaping or piling up, as described. The bran or husk of wheat is exceedingly tough and tenacious, and when it accumulates at any point between the stones it offers such resistance as to cause the runner to tilt or tip until the two stones touch or come in contact at the skirt on the opposite side of the spindle-bearing. When it can no longer tip or yield in this direction the accumulated bran and meal is moved along, only to again accumulate and tip the stone in another direction. This heaping up and tipping action becomes comparatively regular in its succession, and results in giving the runner a wabbling and unsteady motion. The motion thus caused tends to impart to the runner, and thence to the spindle, a vertical tremor or vibration, and as the bridge-tree has heretofore been supported, it would readily yield to such tendency, and the up-and-down motion or vibration, becoming synchronous or harmonious with the wabbling motion, reacts upon it in such way as to give the runner a peculiar resultant motion, which my experiments have demonstrated to be the cause of the peculiar wearing action described. With a run of stone moving with such irregularities, even though comparatively small, it is simply impossible for the most skilled operator to secure the best results in milling. Where the faces of the stones come in contact the meal will be powdered to dust, and more or less "killed" bran will be cut and broken into fine particles, and on the opposite side of the stones, where they are most separated, coarse and imperfectly ground products will be discharged.

I have described and claimed in a separate application means for preventing the vertical vibration of the spindle referred to.

My present invention has in view the removal or avoiding of this heaping or piling-up tendency, which is the primary cause of disturbance, and this I do by dressing the lands or grinding-faces of the stones as follows:

In Fig. 2, $a$ represents the lands, and $c$ the furrows, of a millstone. Any desired system of lands and furrows, with any desired draft, may be employed, as my invention is not confined to any particular order or arrangement, the one shown being merely for the purpose of illustration. Instead of extending some or all of these lands $a$ from the skirt to the eye or bosom of the stone in or nearly in a common plane, as heretofore, I limit them all to a narrow belt at or around the skirt, and from points $e$, at or near the skirt, I bevel or incline the face of the stone, between furrows, both toward the eye of the stone or radially, and also toward the furrow from which such incline receives meal; and to this double incline, which I have lettered $a'$, I give a rounded surface, gradually merging the furrow-incline $c'$, the land-face $a$, and inclined face $a'$ by easy and gradual curves, thereby avoiding surface-angles and abrupt changes of direction. This shaping of the stone's face may be described in other words by saying that over that part within the points $e$ the delivery-slopes of the furrows are carried over in rounded lines from one furrow to the next, cutting away the intermediate face of the stone most or deepest at the eye, and gradually raising such surface outward (forming a ridge, $c^2$, along the receiving side of the next furrow) to some point, $e$, near the skirt of the stone, merging the double-sloping surface thus formed into the land-face $a$, which extends from such merging-line to the skirt. I have further illustrated this curve or inclination of the faces $a'$ by the diagram views, Figs. 3 and 4. Fig. 3 shows the rounded inclination from furrow to furrow, taken in the lines $w\,w$, $y\,y$, $x\,x$, and $z\,z$, while Fig. 4 illustrates the parallel relationship of the land-faces $a$ of the two stones, as well as the slope or divergence of the inner part of the stone's face, along the crests of the ridges $c^2$, taken in a radial direction. The extent of this divergence is, by preference, sufficient to separate the surfaces of the upper and lower stones at their points of nearest approach next the eye, by a distance a little less than the average thickness of the kernel of grain to be ground, so that the kernel entering the lowest part of a furrow next the eye cannot pass to the next adjacent furrow without being cracked or broken, which is preliminary to grinding.

The depth of the furrows, both at the eye and at the skirt, may be regulated as desired by the miller, and in some systems of grinding the furrows may almost or quite vanish at the skirt. The distance of the point $e$ from the skirt, or the size of the level land-faces $a$, may also be varied.

In making what is termed a "straight grade" of flour I begin to dress down or slope the faces $a'$ at about six inches from the skirt on a four and one-half foot stone; but when the stones are to be used for making or producing middlings only, I prefer to bring the taper or incline $a'$ still nearer the skirt.

I do not wish to limit my invention to any particular shaping or molding of the surface $a'$ into the furrow-incline $c'$ and land-face $a$; but such a form should be adopted as will avoid surface-angles, and especially where the land-face $a$ merges into the inclined face $a'$ care should be taken to make the change gradual and without angles or roughness. When the stones are thus shaped the grain is broken down gradually between the inclined faces $a'$ as it is worked outward and around by the motion of the runner, and the amount of reduction at the various points is proportioned to the rate of motion of the stone, so that instead of suddenly jamming or wedging the crushed bran and meal between two closely-running flat faces near the eye, as heretofore, it is carried outward and reduced uniformly and evenly between the outwardly-approaching faces $a'$ until that part of the stone is reached which moves quickly or swiftly, where sufficient level land $a$ can be obtained in a comparatively narrow belt to effect the desired grinding. I have found by continued and repeated experiments that not only will the stones retain for a long time true faces when they are prepared or dressed in this way, but also that they have a corrective tendency, or a tendency to restore by use true faces when such faces have previously been worn or dressed "in wind." This corrective tendency is, I consider, satisfactory proof that the cause of previous trouble has been correctly stated by me, and that my invention is calculated to remove the same.

By means of this improvement a superior quality of ground product is obtained, practically free from the objections above named. The bran is not cut and broken to an injurious extent, the flour is not powdered to dust and killed, and the middlings obtained are greatly increased in quantity and graded within comparatively narrow limits. These results, though of the greatest importance, are incidental to my invention, the immediate end sought being to prevent the packing of bran and meal between the stones near the eye or bosom, and thus prevent the tipping, wabbling, and irregular motion of the runner.

I claim herein as my invention—

A run of millstone having their level lands limited to a comparatively narrow belt at the skirt, from the inner edges of which lands the face of the stones between furrows is gradually sloped toward the eye and toward the preceding furrow, substantially as and for the purposes set forth.

In testimony whereof I have hereunto set my hand.

BENJAMIN D. SANDERS.

Witnesses:
C. L. PARKER,
R. H. WHITTLESEY.